US012568046B2

(12) United States Patent　　(10) Patent No.: US 12,568,046 B2
Eastlake, III et al.　　(45) Date of Patent: Mar. 3, 2026

(54) OBTAINING SOURCE ROUTING INFORMATION FOR PACKETS IN A COMPUTER NETWORK

(71) Applicant: Futurewei Technologies, Inc., Addison, TX (US)

(72) Inventors: Donald Eggleston Eastlake, III, Apopka, FL (US); Haoyu Song, Addison, TX (US)

(73) Assignee: Futurewei Technologies, Inc., Addison, TX (US)

( * ) Notice: Subject to any disclaimer, the term of this patent is extended or adjusted under 35 U.S.C. 154(b) by 391 days.

(21) Appl. No.: 18/169,037

(22) Filed: Feb. 14, 2023

(65) Prior Publication Data

US 2023/0291686 A1　　Sep. 14, 2023

Related U.S. Application Data

(60) Provisional application No. 63/319,133, filed on Mar. 11, 2022.

(51) Int. Cl.
　*H04L 45/00*　　(2022.01)
　*H04L 45/74*　　(2022.01)
　*H04L 61/4511*　　(2022.01)
(52) U.S. Cl.
　CPC .............. *H04L 45/74* (2013.01); *H04L 45/34* (2013.01); *H04L 61/4511* (2022.05)
(58) Field of Classification Search
　CPC ..... H04L 45/74; H04L 45/34; H04L 61/4511; H04L 45/741
　See application file for complete search history.

(56) References Cited

U.S. PATENT DOCUMENTS 11,122,131 B1 * 9/2021 Zelezniak ............. H04L 67/101
2022/0231948 A1 * 7/2022 Zheng .................... H04L 45/34

FOREIGN PATENT DOCUMENTS

WO　　WO-2017184528 A2 * 10/2017 ........... G06F 16/245

OTHER PUBLICATIONS

"DOD Standard Inernet Protocol," RFC 760, Jan. 1980, 46 pages.
Abley, "Resource Records for EUI-48 and EUI-64 Addresses in the DNS," RFC 7043, Oct. 2013, 8 pages.
Bradner, "Key Words for Use in RFCs to Indicate Requirement Levels," RFC 2119, Mar. 1997, 3 pages.
Deering, et al., "Internet Protocol, Version 6 (IPv6) Specification," RFC 8200, Jul. 2017, 42 pages.
Filsfils, Ed., et al, "Segment Routing over IPv6 (SRv6) Network Programming", RFC 8986, DOI 10.17487/RFC8986, Feb. 2021, 40 pages.

(Continued)

*Primary Examiner* — Cheikh T Ndiaye
(74) *Attorney, Agent, or Firm* — Conley Rose, P.C.

(57) ABSTRACT

A method performed by a Domain Name System (DNS) name server for providing Segment Routing (SR) Internet Protocol (IP) version 6 (SRv6) information. The method includes receiving a DNS query for an SRv6 resource record (RR) corresponding to a DNS name; determining whether data corresponding to the DNS name comprises the SRv6 RR in response to the DNS query; and transmitting a DNS response, wherein the DNS response comprises the SRv6 RR when the data comprises the SRv6 RR.

20 Claims, 6 Drawing Sheets

700

TRANSMIT A DNS QUERY FOR AN SRV6 RR CORRESPONDING TO A DNS NAME　～702

RECEIVE A DNS RESPONSE IN RESPONSE TO THE DNS QUERY　～704

INSERT DATA FROM THE SRV6 RR INTO A HEADER OF A PACKET　～706

TRANSMIT PACKET ALONG A ROUTE ACCORDING THE DATA　～708

(56)                    References Cited

OTHER PUBLICATIONS

Filsfils, Ed., et al., "Segment Routing Architecture", RFC 8402, DOI 10.17487/RFC8402, Jul. 2018, 32 pages.
Filsfils, Ed., et al, "IPv6 Segment Routing Header (SRH)," RFC 8754, Mar. 2020, 27 pages.
Gulbrandsen, et al, "A DNS RR for Specifying the Location of Services (DNS SRV)," RFC 2782, Feb. 2000.
Gustafsson, "Handling of Unknown DNS Resources Record (RR) Types," RFC 3597, Sep. 2003, 8 pages.
Hoffman, et al., "DNS Terminology," RFC 8499, Jan. 2019, 50 pages.
Leiba, "Ambiguity of Uppercase vs Lowercase in RFC 2119 Key Words," RFC 8174, May 2017, 4 pages.
Mockapetris, "Domain Names—Implementation and Specification," RFC 1035, Nov. 1987, 55 pages.
Mockapetris, P., "Domain names—concepts and facilities", STD 13, RFC 1034, Doi 10.17487/RFC1034, Nov. 1987, 55 pages.
Postel, J., "Internet Protocol", STD 5, RFC 791, DOI 10.17487/RFC0791, Sep. 1981, 51 pages.
Vasseur, Ed., et al, "Path Computation Element (PCE) Communication Protocol (PCEP)," RFC 5440, Mar. 2009, 87 pages.

\* cited by examiner

100

200

Figures 3, 4:
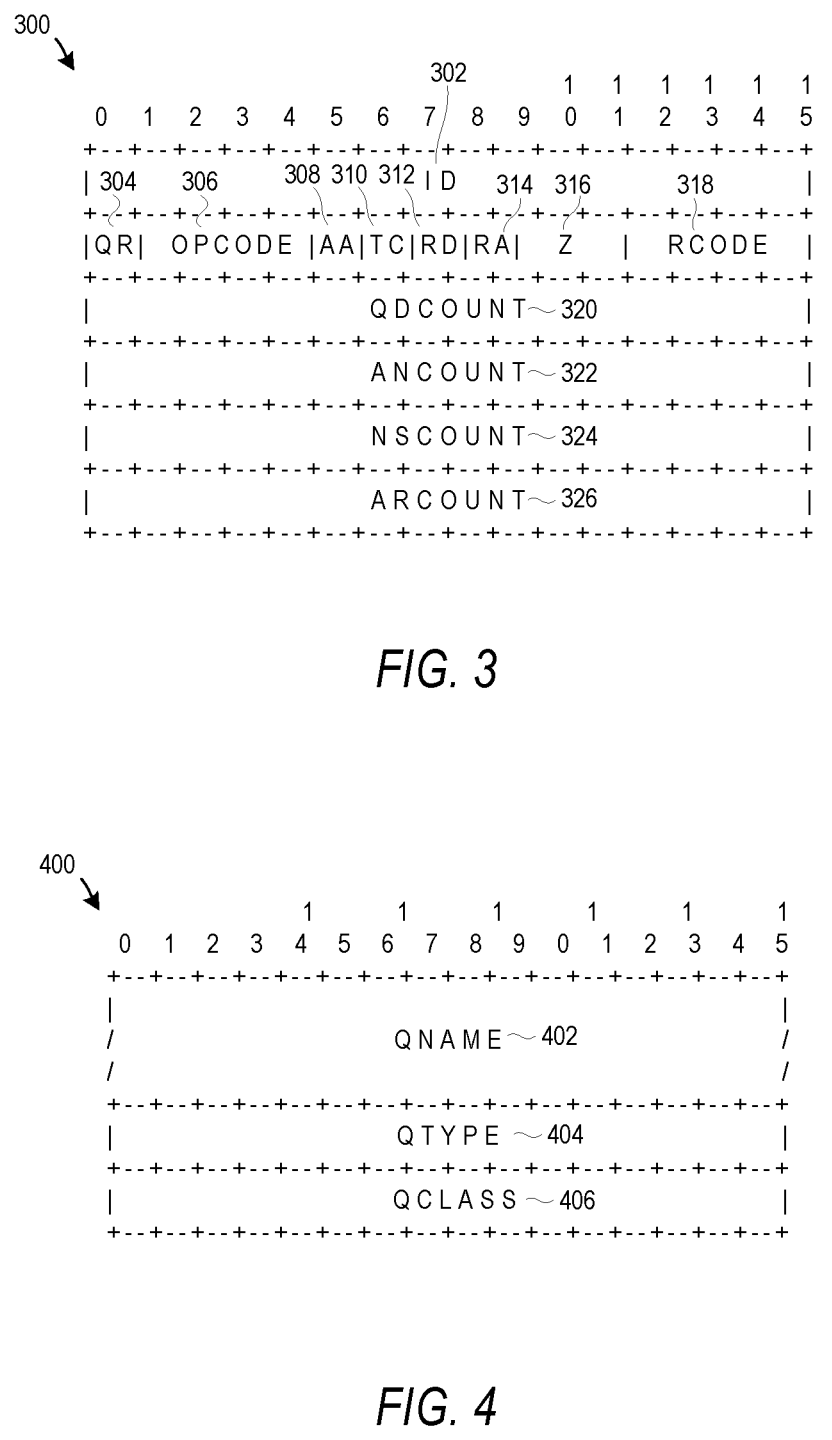

300

```
                                        302        1   1   1   1   1   1
        0   1   2   3   4   5   6   7 /  8   9   0   1   2   3   4   5
      +--+--+--+--+--+--+--+--/+--+--+--+--+--+--+--+--+
      | 304    306      308 310 312 | D   314 316       318      |
      +--+--+--+--+--+--+--+--+--+--+--+--+--+--+--+--+
      |QR|  OPCODE  |AA|TC|RD|RA|    Z    |    RCODE    |
      +--+--+--+--+--+--+--+--+--+--+--+--+--+--+--+--+
      |                  Q D C O U N T ~ 320             |
      +--+--+--+--+--+--+--+--+--+--+--+--+--+--+--+--+
      |                  A N C O U N T ~ 322             |
      +--+--+--+--+--+--+--+--+--+--+--+--+--+--+--+--+
      |                  N S C O U N T ~ 324             |
      +--+--+--+--+--+--+--+--+--+--+--+--+--+--+--+--+
      |                  A R C O U N T ~ 326             |
      +--+--+--+--+--+--+--+--+--+--+--+--+--+--+--+--+
```

0 0 0 0 0 0 0 0 0 0 1 1 1 1 1 1 1 1 1 1 2 2 2 2 2 2 2 2 2 2 3 3
   0 1 2 3 4 5 6 7 8 9 0 1 2 3 4 5 6 7 8 9 0 1 2 3 4 5 6 7 8 9 0 1
   + - + - + - + - + - + - + - + - + - + - + - + - + - + - + - + - +
   |                       F L A G S ～602                         |
   +-+-+-+-+-+-+-+-+-+-+-+-+-+-+-+-+-+-+-+-+-+-+-+-+-+-+-+-+-+-+-+-+
   |                                                               |
   |        128-BIT SRV6 ADDRESS/INSTRUCTION ～604                  |
   |                                                               |
   |                                                               |
   +-+-+-+-+-+-+-+-+-+-+-+-+-+-+-+-+-+-+-+-+-+-+-+-+-+-+-+-+-+-+-+-+
   .                                                               .
   .      ADDITIONAL 128-BIT SRV6 ADDRESSES/INSTRUCTIONS ～606 .
   .                                                               .
   ...............................................................
   //                                                             //
   //    OPTIONAL TYPE LENGTH VALUE OBJECTS (VARIABLE) ～608 //
   //                                                             //
   +-+-+-+-+-+-+-+-+-+-+-+-+-+-+-+-+-+-+-+-+-+-+-+-+-+-+-+-+-+-+-+-+
```

FIG. 6

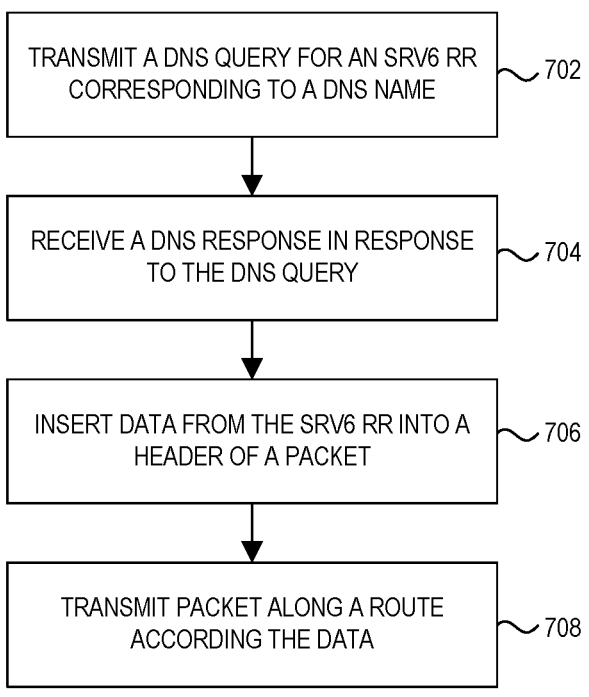
700
TRANSMIT A DNS QUERY FOR AN SRV6 RR
CORRESPONDING TO A DNS NAME — 702
RECEIVE A DNS RESPONSE IN RESPONSE
TO THE DNS QUERY — 704
INSERT DATA FROM THE SRV6 RR INTO A
HEADER OF A PACKET — 706
TRANSMIT PACKET ALONG A ROUTE
ACCORDING THE DATA — 708
*FIG. 7*

800

RECEIVE A DNS QUERY FOR AN SRV6 RR
CORRESPONDING TO A DNS NAME    802

PERFORM DNS LOOKUP    804

DNS NAME
FOUND?    806

N → TRANSMIT DNS
RESPONSE INDICATING
ERROR    812

Y

DNS NAME
DATA INCLUDE
SRV6 RR ?    808

N

Y

TRANSMIT DNS RESPONSE THAT INCLUDES
SRV6 RR    810

OBTAINING SOURCE ROUTING INFORMATION FOR PACKETS IN A COMPUTER NETWORK

CROSS-REFERENCE TO RELATED APPLICATIONS

This application claims the benefit of U.S. Provisional Patent Application No. 63/319,133, filed Mar. 11, 2022, by Futurewei Technologies, Inc., and titled "Obtaining Source Routing Information for Packets in a Computer Network," which is hereby incorporated by reference.

TECHNICAL FIELD

The present disclosure is generally related to network communications, and specifically to various systems and methods for obtaining source routing information for packets in a computer network.

BACKGROUND

Internet Protocol (IP) version 6 Segment Routing (SRv6) is a next-generation IP protocol that combines IPV6 and Segment Routing (SR). SR is a source-based routing technique that simplifies traffic engineering and management across network domains. SR removes network state information from transit routers and nodes in the network and places the path state information into packet headers at an ingress node. Utilizing existing IPv6 forwarding technology, SRv6 implements network programming through flexible IPv6 extension headers.

SUMMARY

A first aspect relates to a method performed by a Domain Name System (DNS) name server for providing SRv6 information. The method includes receiving a DNS query for an SRv6 resource record (RR) corresponding to a DNS name; determining whether data corresponding to the DNS name comprises the SRv6 RR in response to the DNS query; and transmitting a DNS response, wherein the DNS response comprises the SRv6 RR when the data includes the SRv6 RR.

Optionally, in a first implementation according to the first aspect, the DNS response indicates an error when the DNS name is not found or when the data does not comprise the SRv6 RR.

Optionally, in a second implementation according to the first aspect or implementation thereof, the SRv6 RR comprises a flags field.

Optionally, in a third implementation according to the first aspect or implementation thereof, the SRv6 RR comprises an ordered set of fields specifying a sequence of SRv6 segments, wherein each field comprises an Internet Protocol version 6 (IPv6) address size quantity.

Optionally, in a fourth implementation according to the first aspect or implementation thereof, the SRv6 RR further comprises an optional type-length-value (TLV) objects field comprising objects that provide additional information related to the sequence of SRv6 segments.

Optionally, in a fifth implementation according to the first aspect or implementation thereof, the IPv6 address size quantity comprises an IPV6 address prefix, a function, and optional function parameters.

A second aspect relates to a method performed by a client device. The method includes transmitting a first DNS query for an SRv6 RR corresponding to a DNS name; and receiving a DNS response in response to the first DNS query.

Optionally, in a first implementation according to the second aspect, the DNS response indicates an error when the DNS name is not found or when data corresponding to the DNS name does not comprise the SRv6 RR.

Optionally, in a second implementation according to the second aspect or implementation thereof, the method further comprises transmitting a second DNS query for an IPV6 RR corresponding to the DNS name when the DNS response indicates an error.

Optionally, in a third implementation according to the second aspect or implementation thereof, the DNS response comprises the SRv6 RR.

Optionally, in a fourth implementation according to the second aspect or implementation thereof, the SRv6 RR comprises a flags field.

Optionally, in a fifth implementation according to the second aspect or implementation thereof, the method further comprises inserting SRv6 data from the SRv6 RR into a header of a packet; and transmitting the packet along a route according the SRv6 data.

Optionally, in a sixth implementation according to the second aspect or implementation thereof, the SRv6 RR comprises an ordered set of fields specifying a sequence of SRv6 segments, wherein each field comprises an Internet Protocol version 6 (IPv6) address size quantity.

Optionally, in a seventh implementation according to the second aspect or implementation thereof, the IPV6 address size quantity comprises an IPV6 address prefix, a function, and optional function parameters.

Additional aspects includes a DNS name server, a client device, and a computer program product specially configured to perform any of the foregoing aspects or implementation thereof.

For the purpose of clarity, any one of the foregoing implementations or embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a schematic diagram illustrating a header format of a DNS query or a DNS response according to an embodiment of the present disclosure.

FIG. 4 is a schematic diagram illustrating a question format of a DNS query or a DNS response according to an embodiment of the present disclosure.

FIG. 5 is a schematic diagram illustrating an RR format according to an embodiment of the present disclosure.

FIG. 6 is a schematic diagram illustrating an SRv6 RR data format according to an embodiment of the present disclosure.

FIG. 7 is a flowchart illustrating a method performed by a client for obtaining SRv6 information from the DNS according to an embodiment of the present disclosure.

DETAILED DESCRIPTION

It should be understood at the outset that although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for obtaining SRv6 information for packets in a computer network. In particular, embodiments of the present disclosure include a new DNS RR type that includes SRv6 information for a DNS name of a host or service, referred to herein as an SRv6 RR type. The SRv6 RR type is stored at a network device referred to as a DNS name server. When the DNS name server receives a query for the SRv6 RR type corresponding to a DNS name from a client, the DNS name server performs a lookup, and when the SRv6 RR type corresponding to the DNS name is found, the DNS name server returns a DNS RR response that includes the SRv6 RR type corresponding to the DNS name to the client. The client can insert the information contained in the SRv6 RR into the header of one or more packets for SRv6 handling.

Figure 1:
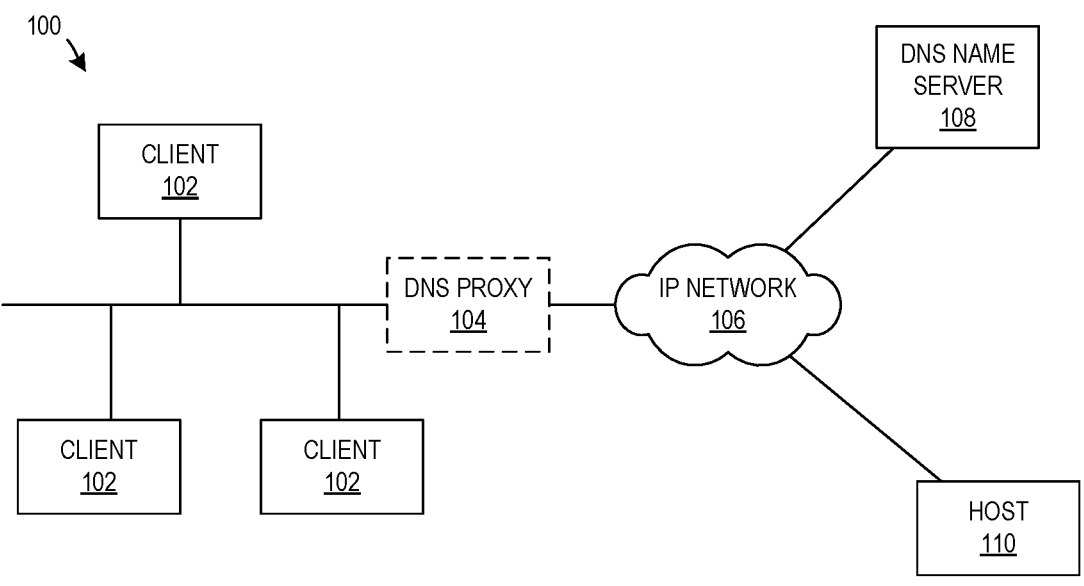
FIG. 1 is a schematic diagram illustrating a DNS network according to an embodiment of the disclosure.

FIG. 1 is a schematic diagram illustrating a DNS network 100 according to an embodiment of the disclosure. In the DNS network 100, a plurality of client devices (client) 102 can communicate with a DNS name server 108 over an Internet Protocol (IP) network 106. The IP network 106 may include both private and public IP networks (e.g., the Internet). The DNS name server 108 is part of a global distributed system, referred to as DNS, that provides secure, reliable, and a convenient method of storing and retrieving data at hierarchically organized names. DNS is described in Internet Engineering Task Force (IETF) document Request for Comments (RFCs) including RFC 1034 entitled "Domain Names-Concepts And Facilities" by P. Mockapetris, published November 1987 (RFC 1034), and in a companion IETF document RFC 1035 entitled "Domain Names-Implementation And Specification" by P. Mockapetris, published November 1987 (RFC 1035). In general, DNS names are names of services (e.g., Voice over Internet Protocol (VOIP) or Instant Messaging (IM)) or hosts such as host 110. The host 110 is a network device that host/provides data or other services to the client 102. The client 102 may be any type of device capable of communicating with the DNS name server 108 over the IP network 106. For example, the client 102 may be the computer, laptop, tablet, or smartphone of a user, and the host 110 may be a server that hosts/provides a banking website or a commercial store front to the user. DNS names are structured into hierarchical zones. The domain name space is a tree structure. The DNS enables a client 102 to locate the multiple servers (e.g., DNS name server 108) that provide the information for the names in a zone. The DNS name server 108 is a server that stores information about a domain (e.g., a tree structure of the domain and set information). In general, a particular name server has complete information about a subset of the domain space, and pointers to other name servers that can be used to lead to information from any part of the domain tree.

Optionally, in some cases, as shown in FIG. 1, a DNS proxy 104 may handle DNS requests/queries and query responses between a client 102 and the DNS name server 108. The DNS proxy 104 simplifies network management. For example, when the address of the DNS name server 108 is changed, the new address of the DNS name server 108 only needs to be updated the DNS proxy 104 instead of on each client 102.

The DNS name server 108 stores data corresponding to a DNS name in an information record format referred to as an RR. There are various types of RR. For example, commonly, the data retrieved from the DNS name server 108 is addressing information (e.g., Internet Protocol (IP) version 4 (IPv4) addresses or IP version 6 (IPv6) addresses) corresponding to a DNS name. DNS stores IPv4 addresses in an "A" RR type and IPV6 addresses in an "AAAA" RR type. Addresses such as those stored in the type "A" and "AAAA" RRs may be used as a destination to send data packets over networks. The DNS can provide other types of data such as information for an email domain stored in a mail exchanger "MX" RR type, an authoritative DNS name server for a domain stored in nameserver "NS" RR type, admin information about a domain stored in a start of authority "SOA" RR type, port information for specific services stored in "SRV" RR, and public keys certificates stored in a "CERT" RR type.

To obtain data from the DNS, a client 102, using a program or a set of dynamic library routines referred to as a resolver, can send requests or queries to the DNS name server 108. A query names the domain name of interest and describes the type of resource information that is desired. DNS queries and responses are carried in a DNS message format as described below.

Figure 2:
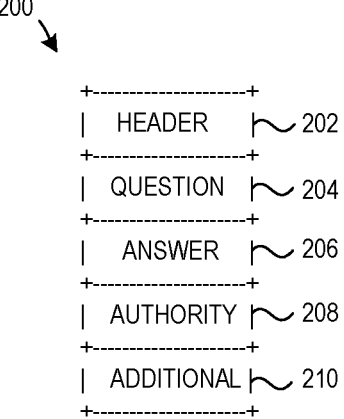
FIG. 2 is a schematic diagram illustrating a message format of a DNS query or a DNS response according to an embodiment of the present disclosure.

FIG. 2 is a schematic diagram illustrating a DNS message format 200 of a DNS query or a DNS response according to an embodiment of the present disclosure. The DNS message format 200 includes the following five sections: header 202, question 204, answer 206, authority 208, and additional 210.

The header 202 section is always present. The header 202 section, as shown in FIG. 3, includes fields that specify which of the remaining sections are present and that specify whether the message is a query or a response, a standard query or some other opcode, etc.

The question 204 section contains fields that describe a question and other query parameters to a name server. The question 204 section may include more than one question (also referred to as an entry). The number of entries in the question 204 section is specified in the header 202 in a QDCOUNT field as shown and described in FIG. 3. Each entry or question is specified using the question format 400 as shown and described in FIG. 4.

The answer 206 section contains RRs, if any, that answer the question. The authority 208 section contains RRs, if any, that point toward an authoritative name server. The additional 210 section contains RRs, if any, holding additional information which relate to the query, but are not strictly answers for the question. For example, the additional 210 section may include RRs that may be helpful in using the RRs in the answer 206 section and/or the authority 208 section. All RRs have the same top level format as shown and described in FIG. 5.

FIG. 3 is a schematic diagram illustrating a header format 300 of a DNS query or a DNS response according to an embodiment of the present disclosure. The header format 300 may be the format used for the header 202 section in the DNS message format 200 of FIG. 2. The header format 300 includes the following fields: identifier (ID) 302, query/response (QR) 304, operation code (OPCODE) 306, authoritative answer (AA) 308, truncation (TC) 310, recursion desired (RD) 312, recursion available (RA) 314, reserved (Z) 316, response code (RCODE) 318, question count (QDCOUNT) 320, answer count (ANCOUNT) 322, name server count (NSCOUNT) 324, and additional records count (ARCOUNT) 326.

The ID 302 field specifies a 16 bit identifier assigned by the program that generates the query. This identifier is copied in the corresponding reply and can be used to match replies to queries. The QR 304 field is a one bit field that specifies whether this message is a query (0), or a response (1). The OPCODE 306 field is a four bit field that specifies the kind of query in this message. For example, 0 indicates a standard query, 1 an inverse query, and 2 a server status request. This value is set by the originator of a query and copied into the response. The AA 308 field is a one bit field used in query responses to specify that the responding name server is an authority for the domain name specified in the question 204 section of the DNS message format 200 of FIG. 2. The TC 310 field is a one bit field that indicates whether the message was truncated due to length greater than that permitted on the transmission channel. The RD 312 field is a one bit field that may be set in a query to request the name server to pursue the query recursively. The RA 314 field is a one bit field that is set or cleared in a response to denote whether recursive query support is available in the name server. The Z 316 field is a reserved field that is set to zero in all queries and responses. The RCODE 318 field is a 4 bit field that is set in responses to indicate whether an error occurred and the type of error. The QDCOUNT 320 field specifies an unsigned 16 bit integer indicating the number of entries in the question 204 section of the DNS message format 200 of FIG. 2. The ANCOUNT 322 field specifies an unsigned 16 bit integer indicating the number of RRs in the answer 206 section of the DNS message format 200 of FIG. 2. The NSCOUNT 324 field specifies an unsigned 16 bit integer indicating the number of name server RRs in the authority 208 section of the DNS message format 200 of FIG. 2. The ARCOUNT 326 field specifies an unsigned 16 bit integer indicating the number of RRs in the additional 210 section of the DNS message format 200 of FIG. 2.

FIG. 4 is a schematic diagram illustrating a question format 400 of a DNS query or a DNS response according to an embodiment of the present disclosure. The question format 400 may be used to specify a question in the question 204 section of the DNS message format 200 of a DNS query or a DNS response as shown and described in FIG. 2.

The question format 400 includes a query domain name (QNAME) 402 field, a query type (QTYPE) 404 field, and a query class (QCLASS) 406 field. The QNAME 402 field specifies a domain name, which is represented as a sequence of labels. The QTYPE 404 field specifies a two octet code indicating a query type. The type values for the query type are the same as the type values for a RR type. Thus, the QTYPE 404 field correspondingly indicates the RR type to return in a DNS response to the query. Various query/RR types and their assigned values are defined in RFC 1035. The QCLASS 406 field specifies a two octet code indicating the class of the query (e.g., IN for the Internet), and correspondingly the class of the RR type to return in a DNS response to the query. Most often, the QCLASS 406 field contains a class value of 1 for "IN" or Internet address class, which is common for DNS RRs involving Internet hostnames, servers, or IP addresses. Other classes exist, but are rarely used.

FIG. 5 is a schematic diagram illustrating an RR format 500 according to an embodiment of the present disclosure. The RR format 500 may be used to encode one or more RRs for the answer 206 section, the authority 208 section, and/or the additional 210 section of a DNS response to DNS query using the DNS message format 200 as shown and described in FIG. 2. The RR format 500 includes the following fields: name 502, type 504, class 506, time to live (TTL) 508, resource data length (RDLENGTH) 510, and resource data (RDATA) 512.

The name 502 field is a variable length field that specifies a domain name (e.g., example.com) to which this resource record pertains.

The type 504 field is a two octets field containing an RR type code/value indicating an RR type. The type 504 field provides context or meaning to the data in the RDATA 512 field as described below. For example, a value of 1 in the type 504 field indicates the RR is an "A" RR type and the data in the RDATA 512 field is an IPV4 host address. As stated above, the values of various RR types are defined in RFC 1035 and other subsequent documents.

The class 506 field is a two octets field containing one of the RR CLASS codes indicating an address class. Each class is an independent name space with potentially different root servers and delegations of DNS zones. Similar to the QCLASS 406 field of the question format 400 as shown and described in FIG. 4, the class 506 field often contains a class value of 1 for IN or Internet address class.

The TTL 508 field contains a 32 bit signed integer that specifies the time interval that the RR may be cached before the source of the information should again be consulted. Zero values are interpreted to mean that the RR can only be used for the transaction in progress, and should not be cached. For example, SOA RRs are always distributed with a zero TTL to prohibit caching. Zero values can also be used for extremely volatile data.

The RDLENGTH 510 field contains an unsigned 16 bit integer that specifies the length in octets of the RDATA 512 field.

The RDATA 512 field contains a variable length string of octets that describes the RR (i.e., carries the data of the RR). The format of this information varies according to the RR type (specified in the type 504 field) and RR class (specified in the class 506 field) of the RR. For example, when the RR type is 1 indicating an address or "A" type RR and RR class is 1 indicating an IN or Internet class type, then the data in the RDATA 512 field are IPv4 host addresses. When the RR type is 28 indicating an "AAAA" type RR and RR class is 1, then the data in the RDATA 512 field are IPv6 host addresses.

As stated above, SRv6 protocol combines segment routing (SR) and IPV6. IPV6 is defined in IETF document RFC 8200 entitled "Internet Protocol, Version 6 (IPv6) Specification" by S. Deering, et al., published July 2017. SR provides a mechanism that allows a flow to be restricted to a specific topological path. SR is commonly used in data centers or a domain under a common control. SR is an extension of source routing. IPv4 and IPV6 have long provided header options to include an ordered sequence of addresses in a packet header so the packet travels in order through the nodes specified by that sequence of addresses. This is often referred to as "source routing" because the route or path the packet follows is set, at least in part, when the sequence of addresses is added to the packet, usually at the packet's source, rather than being dynamically determined as the packet proceeds through the network. Source routing may be loose or strict. Loose source routing means that a packet is directed sequentially to the nodes whose addresses are given in the ordered sequence of addresses, but the path of the packet is not constrained between those nodes. Strict source routing means that packet traverses, in sequence, the nodes whose addresses are given in the ordered sequence without traversing any other intermediate nodes.

In general, SR extends source routing by allowing the addresses in the sequence to be or to contain "instructions" or a structure such as an address part, a function designator part, and an arguments part (referred to as a segment in SR). For instance, IETF document RFC 8986 entitled "Segment Routing over IPv6 (SRv6) Network Programming" by C. Filsfils, et al., published February 2021 defines the structuring of an IPV6 address size quantity such that it is composed of addressing information followed by a function designation which is optionally further followed by arguments/parameters to that function. Thus, in SR, a node steers a packet through an ordered list of segments, where a segment can include an address, an instruction, and instruction parameters. For example, a segment may be associated with a topological instruction. A topological local segment may instruct a node to forward the packet via a specific outgoing interface. A topological global segment may instruct an SR domain to forward the packet via a specific path to a destination. Different segments may exist for the same destination, each with different path objectives (e.g., which metric is minimized, what constraints are satisfied). A segment may be associated with a service instruction (e.g., the packet should be processed by a container or virtual machine (VM) associated with the segment). A segment may be associated with a quality of service (QOS) treatment (e.g., shape the packets received with this segment at x megabits per second (Mbps)). The SR architecture supports any type of instruction associated with a segment.

A segment may be encoded as an multi-protocol label switching (MPLS) label. An SR policy is then instantiated as a stack of labels. The segment to process (i.e., the active segment) is on the top of the stack. Upon completion of a segment, the related label is popped from the stack.

SRv6 is SR over an IPV6 data plane. SR can be applied to the IPV6 architecture using a routing header called an SR header (SRH) as part of the headers of an IPV6 packet to indicate an IPv6 SR sequence of addresses/instructions. The SRH is defined according to IETF document RFC 8754 entitled "IPv6 Segment Routing Header (SRH)" by C. Filsfils, et al., published March 2020. As stated above, SR extends source routing by allowing the addresses in the sequence (referred to as segments in SR) to be or to contain instructions and optional instruction parameters. This is especially useful for IPV6 because each IPV6 address is large enough to provide room for information beyond strictly addressing information. Furthermore, because a sequence of such IPV6 address size quantities may each start with the same constant addressing prefix, methods of compression have been suggested to represent this addressing prefix less often and pack an increased number of SRv6 quantities into an SRH where each SRv6 quantity may consist optionally of additional address information and/or function designation and/or function arguments. Thus, SRv6 enables a network operator or an application to specify a packet processing program by encoding a sequence of instructions in the IPV6 packet header. Each instruction is implemented on one or several nodes in the network and identified by an SRv6 segment identifier (SID) in the packet. Often a SRv6 segment is referred to by its SID. Thus, an SRv6 segment is commonly called an SRv6 SID. An SR Policy is instantiated as an ordered list of SRv6 SIDs in the routing header. The active segment is indicated by the destination address (DA) of the packet. The next active segment is indicated by the SegmentsLeft (SL) pointer in the SRH. When an SRv6 SID is completed, the SL is decremented and the next segment is copied to the DA. When a packet is steered on an SR Policy, the related SRH is added to the packet. Additional information on SR and SRv6 is defined IETF document RFC 8402 entitled "Segment Routing Architecture" by C. Filsfils, et al., published July 2018. Furthermore, because a sequence of such address size quantities may start with the same constant addressing prefix, methods of compression have been suggested to represent this addressing prefix less often and pack an increased number of quantities into a Segment Routing header where each quantity may consist optionally of additional address information and/or function designation and/or function arguments.

Current methods of distributing SRv6 information include configuration at any node which might want such information, which may be cumbersome, or by using complex information distribution protocols such as Path Computation Element Protocol. To address this problem, embodiments of the present disclosure include a new DNS RR type that includes SRv6 information for a DNS name of a host or service (referred as an SRv6 RR type). In an embodiment, the SRv6 RR type utilizes the RR format 500 as shown and described in FIG. 5. The type value associated with the SRv6 RR type is to be determined (TBD). The class value associated with the SRv6 RR type is 1 for "IN" or Internet address class. The new SRv6 RR type enables the DNS to store, retrieve, and return SRv6 information for a DNS name to a client device that requests the SRv6 information at a DNS name.

FIG. 6 is a schematic diagram illustrating an SRv6 RR data format 600 according to an embodiment of the present disclosure. The SRv6 RR data format 600 can be used for the storage and retrieval of SRv6 information (e.g., a sequence of IPV6 Segment Routing (or SRv6) addresses/instructions) at a DNS name by a DNS name server. In the depicted embodiment, the SRv6 RR data format 600 includes the following fields: flags 602 field, 128-bit SRv6 address/instruction field 604, additional 128-bit SRv6 address/instruction field(s) 606, and an optional type-length-value (TLV) objects field 608. In the depicted embodiment, the flags 602 field is a 32 bit field that is available for defining flags. Alternatively, the flags 602 field may comprise a different number of bits than that depicted in FIG. 6. For example, the flags 602 field may be a 16 bit field in a different embodiment. Furthermore, two or more adjacent bits in the flags 602 field may be defined as a single field for some purposes, The sequence of IPV6 Segment Routing addresses/instructions is specified in the 128-bit SRv6 address/instruction field 604, which is the first segment of the sequence. The next segment or segments are specified in the additional 128-bit SRv6 address/instruction field(s) 606 (e.g., the second segment is specified in the additional 128-bit SRv6 address/instruction field 606, the third segment is specified in another additional 128-bit SRv6 address/ instruction field 606, the fourth segment is specified in another additional 128-bit SRv6 address/instruction field 606, etc.) In some embodiments, the optional type-length-value (TLV) objects field 608 may include one or more TLV objects that provide additional information related to the sequence of IPV6 Segment Routing addresses/instructions or to the SRv6 Header (SRH).

FIG. 7 is a flowchart illustrating a method 700 for obtaining SRv6 information from the DNS according to an embodiment of the present disclosure. The method 700 can be performed by a client device such as client 102 as shown and described in FIG. 1. At step 702, the client device transmits a DNS query for an SRv6 RR corresponding to a DNS name. The DNS name may be associated with a host or service. The DNS query may be encoded using the DNS message format 200 as shown and described in FIG. 2, where the question 204 section includes an entry/question indicating a value (TBD) corresponding to an SRv6 RR in the QTYPE 404 field as shown and described in FIG. 3. At step 704, the client device receives a DNS response to the DNS query. When the requested SRv6 RR is found at the DNS name, the DNS response includes the requested SRv6 RR. At step 706, the client device can insert the SRv6 information contained in the SRv6 RR into the SRH header of one or more packets for SRv6 handling. At step 708, the client device transmits the packets along a route according the SRv6 information.

In some embodiments, the DNS response indicates an error when the DNS name is not found or when data at the DNS name does not include the requested SRv6 RR. In some embodiments, when no SRV6 RR is present in the DNS at a domain name, the client device could query for the AAAA IPV6 address RR as a backup option.

In some embodiments, multiple SRv6 RRs may be found at the DNS name. For example, as described above, different segments may exist for the same destination, each with different path objectives. Or different segments may exist to different destinations all of which offer the same service. In these embodiments, the DNS response may include all the SRv6 RRs found at the DNS name. The client device or an application on the client device may select (e.g., based on path objective or randomly) which SRv6 RR from a returned set of such RRs to use.

Figure 8:
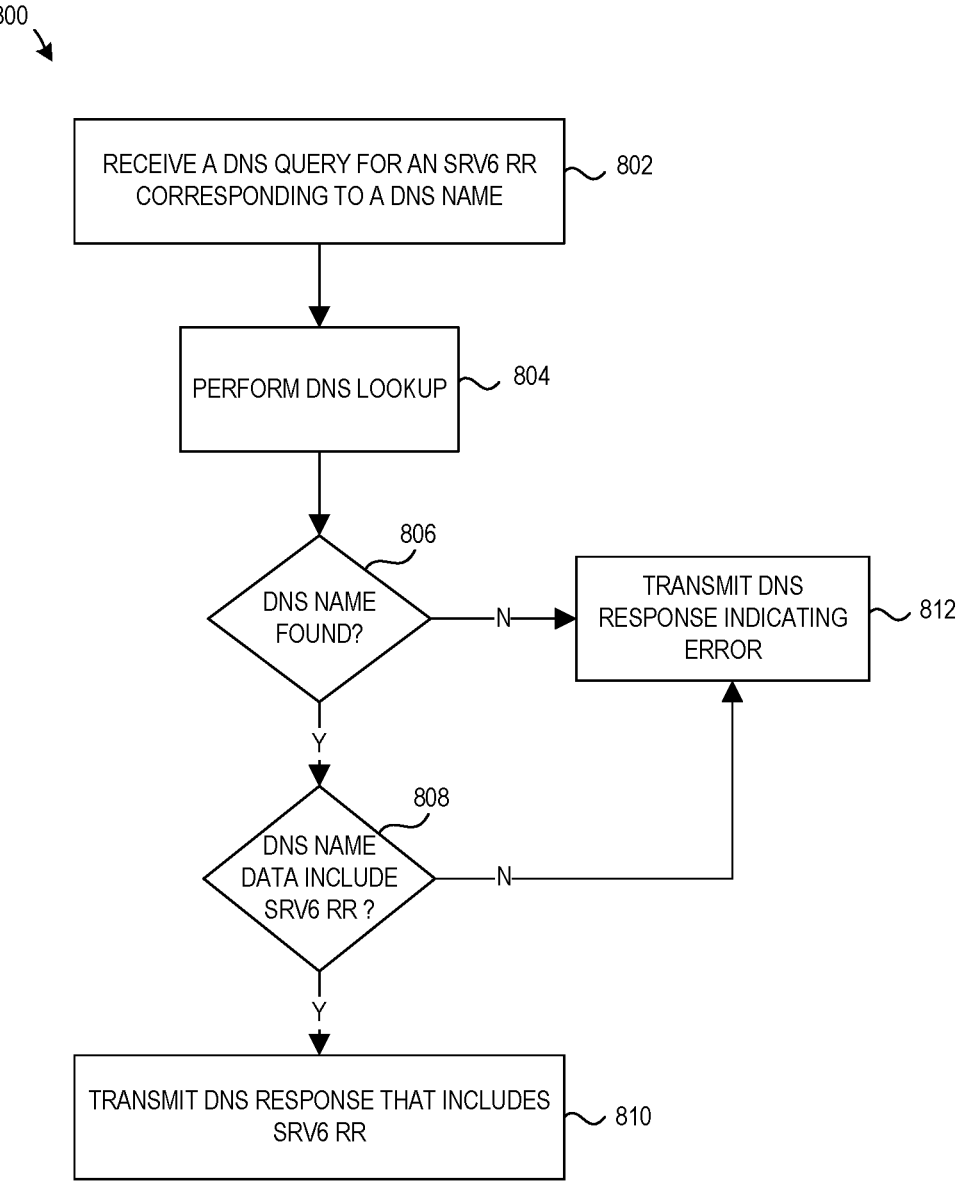
FIG. 8 is a flowchart illustrating a method performed by a DNS name server for providing SRv6 information according to an embodiment of the present disclosure.

FIG. 8 is a flowchart illustrating a method 800 for providing SRv6 information according to an embodiment of the present disclosure. The method 800 can be performed by a DNS name server such as DNS name server 108 as shown and described in FIG. 1. At step 802, the DNS name server receives a DNS query for an SRv6 RR corresponding to a DNS name from a device such the client 102 in FIG. 1. At step 804, the DNS name server performs a DNS lookup based on the DNS query. A DNS lookup, in a general sense, is the process by which the DNS name server identifies the data stored under the DNS name so that the DNS name server can respond with the requested data when found. In an embodiment, if the DNS lookup fails, either because the DNS name (step 806) or an SRv6 RR corresponding to the DNS name is not found (step 808), the DNS name server, at step 812, transmits a DNS response indicating an error to the device that sent the query. When the DNS name and the requested SRv6 RR specified in the DNS query is found, the DNS name server, at step 810, transmits a DNS response that includes the requested SRv6 RR to the device that transmitted the query.

Figure 9:
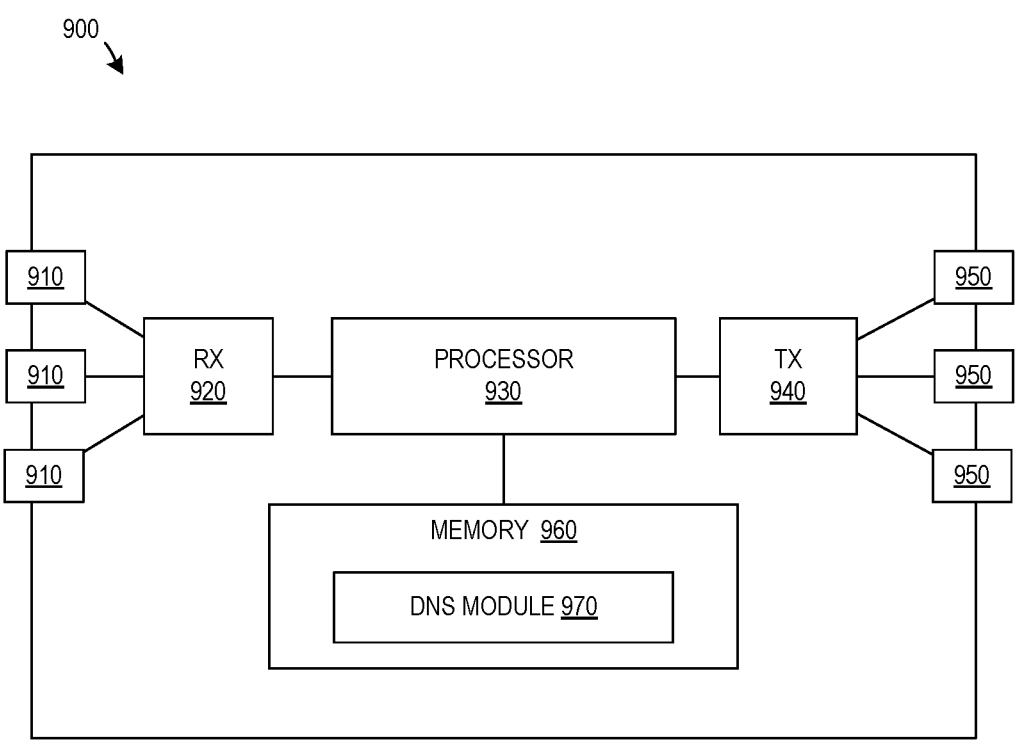
FIG. 9 is a schematic diagram of a system according to an embodiment of the disclosure.

FIG. 9 is a schematic diagram of an apparatus 900 according to an embodiment of the disclosure. The apparatus 900 is suitable for implementing the disclosed embodiments as described herein. In an embodiment, the apparatus 900 may be a client device or a DNS name server specially configured to obtain or provide SRv6 information from the DNS as disclosed herein.

The apparatus 900 comprises ingress ports 910 (or input ports 910) and receiver units (Rx) 920 for receiving data; a processor, logic unit, or central processing unit (CPU) 930 to process the data; transmitter units (Tx) 940 and egress ports 950 (or output ports 950) for transmitting the data; and a memory 960 for storing the data. The apparatus 900 may also comprise other components (not shown) such as, but not limited to, optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more central processing unit (CPU) chips, cores (e.g., as a multi-core processor), field-programmable gate arrays (FPGAs), application-specific integrated circuits (ASICs), and digital signal processors (DSPs). The processor 930 is in communication with the ingress ports 910, receiver units 920, transmitter units 940, egress ports 950, and memory 960. In an embodiment, the memory 960 comprises a DNS module 970 that comprises instructions and data for implementing the disclosed embodiments. For instance, the DNS module 970 includes instructions that when executed by the processor 930 implements, processes, prepares, or provides the various DNS operations for querying or responding to queries for SRv6 RRs. The inclusion of the DNS module 970 therefore provides a substantial improvement to the functionality of the apparatus 900 and effects a transformation of the apparatus 900 to a different state.

The memory 960 may comprise one or more disks, tape drives, and solid-state drives and may be used as an over-flow data storage device, to store programs when such programs are selected for execution, and to store instructions and data that are read during program execution. The memory 960 may be, for example, volatile and/or non-volatile and may be a read-only memory (ROM), random access memory (RAM), ternary content-addressable memory (TCAM), and/or static random-access memory (SRAM). In some instances, the memory 960 may reside or be a component of the processor 930.

Using the disclosed embodiments, an application on a client or host, without significant system changes, can simply query the DNS for needed SRv6 information. Thus, embodiments of the present disclosure provide a rapidly usable method to enable SRv6 in a network without major reconfiguration or network control system changes.

The disclosed embodiments may be a system, an apparatus, a method, and/or a computer program product at any possible technical detail level of integration. The computer program product may include a non-transitory computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. For example, in an alternative embodiment, a more general RR could be defined which includes an "address type" (for example, an address family identifier (AFI)). In this embodiment, a query for this more general RR type at a DNS name would return all of these RRs at that DNS name with possibly varied address types. An application or client would then sort through (i.e., analyzed) all of these RRs to identify the RR that includes SRv6 information.

In another alternative embodiment, the data stored in one or more new RR types might be a sequence of IPV4 addresses or IPV6 addresses with an indication whether that sequence is to be used for Loose or Strict source routing. Or the sequence might be an ordered sequence of other types of addresses. In each case, the new RR type might include additional supplemental information.

The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a Domain Name System (DNS) name server for providing Internet Protocol (IP) version 6 Segment Routing (SRv6) information, the method comprising:

receiving a DNS query for an SRv6 resource record (RR) corresponding to a DNS name;

determining whether data corresponding to the DNS name comprises the SRv6 RR in response to the DNS query; and transmitting a DNS response, wherein the DNS response comprises the SRv6 RR when the data comprises the SRv6 RR, wherein the SRv6 RR comprises an ordered set of fields specifying a sequence of SRv6 segments, and wherein the SRv6 RR further comprises an optional type-length-value (TLV) objects field comprising objects that provide additional information related to the sequence of SRv6 segments.

2. The method of claim 1, wherein the DNS response indicates an error when the DNS name is not found or when the data does not comprise the SRv6 RR.

3. The method of claim 1, wherein the SRv6 RR comprises a flags field.

4. The method of claim 1, wherein each field comprises an Internet Protocol version 6 (IPv6) address size quantity.

5. The method of claim 4, wherein determining whether the data corresponding to the DNS name comprises the SRv6 RR in response to the DNS query comprises determining that the data comprises multiple SRv6 RRs corresponding to the DNS name, and wherein the DNS response comprises the multiple SRv6 RRs.

6. The method of claim 4, wherein the IPV6 address size quantity comprises an IPv6 address prefix, a function, and optional function parameters.

7. A method performed by a client device, the method comprising:

transmitting a first Domain Name System (DNS) query for an Internet Protocol (IP) version 6 Segment Routing (SRv6) resource record (RR) corresponding to a DNS name;

receiving a DNS response in response to the first DNS query; determining whether the DNS response comprises the SRv6 RR, wherein the SRv6 RR comprises an ordered set of fields specifying a sequence of SRv6 segments, and wherein the SRv6 RR further comprises an optional type-length-value (TLV) objects field comprising objects that provide additional information related to the sequence of SRv6 segments;

inserting, when the DNS response comprises the SRv6 RR, SRv6 data from the SRv6 RR into a header of a packet; and transmitting the packet along a route according the SRv6 data.

8. The method of claim 7, further comprising transmitting a second DNS query for an IPV6 RR corresponding to the DNS name when the DNS response indicates an error.

9. The method of claim 8, wherein the error occurs when the DNS name is not found or when data corresponding to the DNS name does not comprise the SRv6 RR.

10. The method of claim 7, wherein the first DNS query comprises a query type code corresponding to an SRv6 RR type.

11. The method of claim 7, wherein the SRv6 RR comprises a flags field.

12. The method of claim 7, wherein each field comprises an Internet Protocol version 6 (IPv6) address size quantity.

13. The method of claim 12, wherein the IPV6 address size quantity comprises an IPv6 address prefix, a function, and optional function parameters.

14. The method of claim 12, wherein the method further comprises selecting the SRv6 RR from multiple SRv6 RRs when the DNS response the multiple SRv6 RRs based on one or more path objectives.

15. A Domain Name System (DNS) name server comprising:

a memory configured to store instructions; and a processor coupled to the memory and configured to execute the instructions to cause the DNS name server to:

receive a DNS query for an Internet Protocol (IP) version 6 Segment Routing (SRv6) resource record (RR) corresponding to a DNS name;

determine whether data corresponding to the DNS name comprises the SRv6 RR in response to the DNS query, wherein the SRv6 RR comprises an ordered set of fields specifying a sequence of SRv6 segments, and wherein the SRv6 RR further comprises an optional type-length-value (TLV) objects field comprising objects that provide additional information related to the sequence of SRv6 segments; and transmit a DNS response, wherein the DNS response comprises the SRv6 RR when the data comprises the SRv6 RR.

16. The DNS name server of claim 15, wherein the DNS response indicates an error when the DNS name is not found or when the data does not comprise the SRv6 RR.

17. The DNS name server of claim 16, wherein each field comprises an IPV6 address size quantity.

18. The DNS name server of claim 17, wherein the IPV6 address size quantity comprises an instruction to be performed by a network node.

19. The DNS name server of claim 17, wherein the IPV6 address size quantity comprises an IPV6 address prefix, a function, and optional function parameters.

20. The DNS name server of claim 17, wherein determining whether the data corresponding to the DNS name comprises the SRv6 RR in response to the DNS query comprises determining that the data comprises multiple SRv6 RRs corresponding to the DNS name, and wherein the DNS response comprises the multiple SRv6 RRs.

* * * * *